Sept. 15, 1970     P. J. PACKMAN ET AL     3,528,164
METHOD OF ASSEMBLING TUBULAR STRUCTURES
Filed Feb. 5, 1968     3 Sheets-Sheet 1
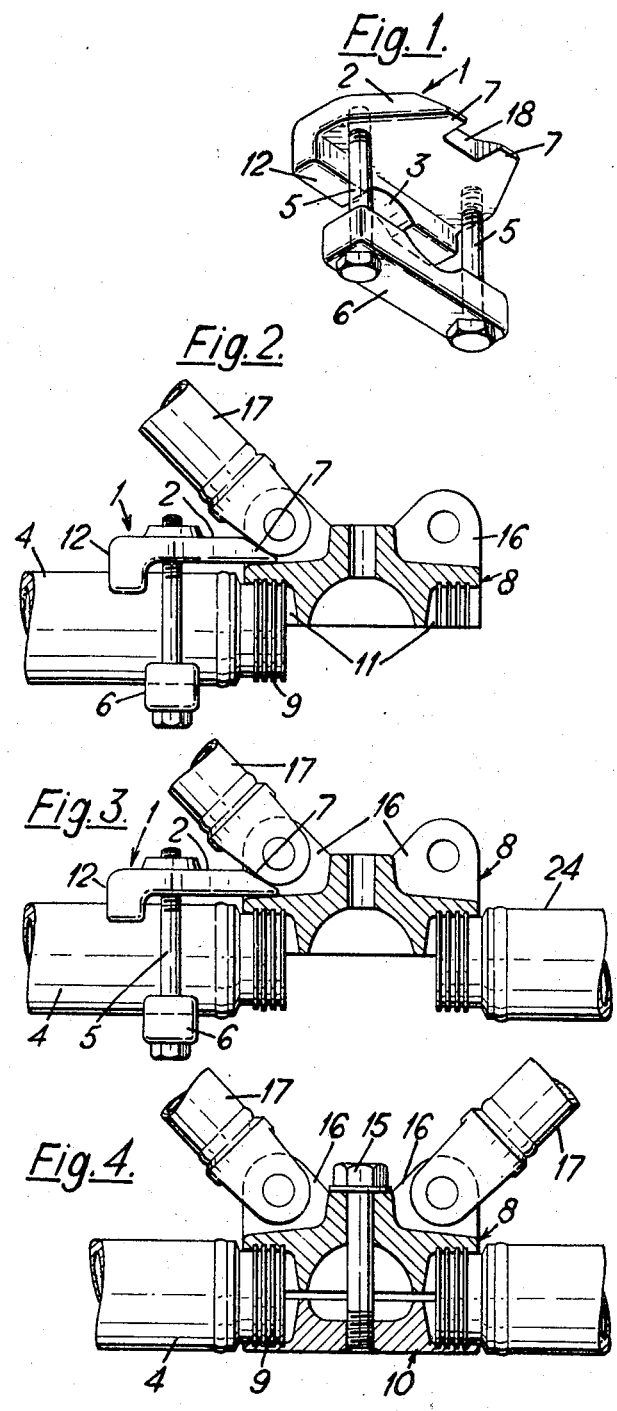

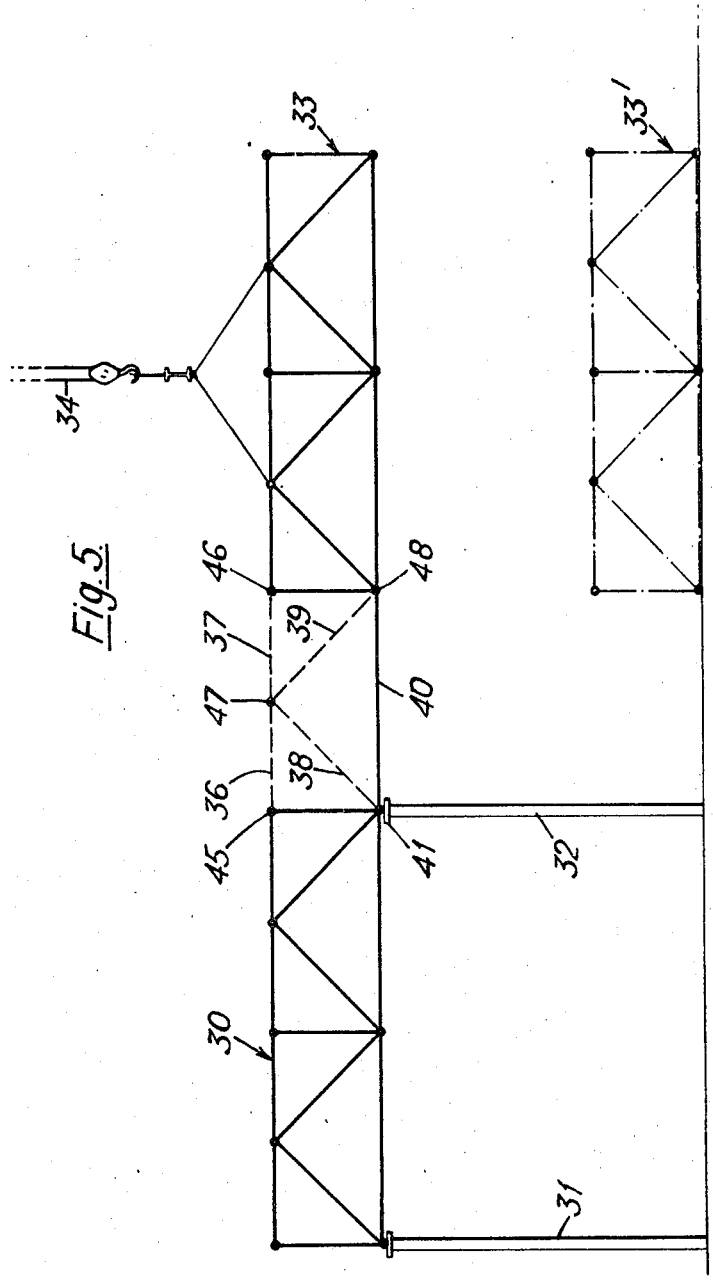

United States Patent Office 3,528,164
Patented Sept. 15, 1970

3,528,164
METHOD OF ASSEMBLING TUBULAR STRUCTURES
Percival J. Packman, Twyford, and Hubert B. Walker, East Barnet, England, assignors to Stewarts and Lloyds Limited, London, England, a British company
Filed Feb. 5, 1968, Ser. No. 703,088
Int. Cl. B23q *3/00, 19/00*
U.S. Cl. 29—468      5 Claims

ABSTRACT OF THE DISCLOSURE

A method of assembling a joint between the ends of a number of tubular steel members lying substantially in a common plane and forming part of a space frame, the joint being made by means of a pair of clamping elements between which the ends of the tubular members are gripped. In this method the ends of one or more of the tubular members are connected temporarily and independently to one of the clamping elements, each by an individual device which does not impede the subsequent fitting of the second clamping element, the ends of the remaining tubular members are brought into their correct positions in relation to the first clamping element, and finally the second clamping element is secured to the first to grip the ends of the tubular members and thus complete the joint.

---

The invention relates to two-dimensional or three-dimensional tubular steel building structures, sometimes known as space frames. Structures of this kind are of particular importance in the construction of fabricated roofs, domes and so forth, which are made in a single, double or even multilayer framework. In such structures the tubular members come together at intervals at common points where they need to be joined together. A junction of three members represents the simplest form of joint but a joint involving a larger number of members is quite common. Although tubular members may reach the joint from different angles in different planes a relatively large proportion of the joints involved are between main members lying in a common plane (or a slightly distorted plane in the case of barrel vaults and domes) in combination with bracing members which either run at an angle with the main members and in a transverse plane which extends on one side of the plane of the main members or in a transverse plane which has been rotated about the centre of the joint. It is with joints of this type that the present invention is concerned.

Such a joint may be made by means of a pair of clamping elements between which the ends of the tubular member are gripped and these elements may be shaped so as to define sockets for the reception of the ends of the tubular members as described in the copending application Ser. No. 687,825. As described in this earlier application the sockets defined by the clamping elements have their opposite sides formed with a transverse recess or projection for cooperation with a complementary configuration of the end of the tubular member. A joint of this type, i.e., including a pair of clamping elements for gripping the ends of the tubular members suffers from the minor disadvantage that when the two clamping elements have been pressed together, whether by means of a single stud or bolt or more than one such stud or bolt, all the tubular members are simultaneously held in position.

Space frames are commonly fabricated as subassemblies at ground level which are subsequently lifted by means of a crane and then connected to the parts of the structure which are already in place. The complete joints which are made at ground level in constructing the subassemblies present no difficulty but joints which come at the edges of the sub-assemblies connect tubular members from that assembly with other tubular members forming part of a sub-assembly which is already in position and are subsequently to be assembled. For this reason only one or more of the tubular members are initially held between the clamping elements which must be subsequently loosened to allow the insertion of the remainder of the members. Not only does this involve a double operation but there is a risk that when the clamping elements are loosened for the insertion of subsequent members some of the members already held in position may be inadvertently disconnected.

According to the present invention a joint between the ends of a number of tubular members held together by means of a pair of clamping elements as described above is assembled by first connecting the ends of one or more or the tubular members temporarily and independently to one of the clamping elements, each by an individual device which does not impede the subsequent fitting of the second clamping element, and then bringing the ends of the remaining tubular members into their correct positions in relation to the first clamping element, after which the second clamping element is finally secured to the first to grip the ends of the tubular members and thus complete the joint. For example, if the joint comprises a total of four tubular members of which two are to be fitted in position initially as part of a sub-assembly and two subsequently when the sub-assembly has been moved to its final position, the first two members may be temporarily connected to one of the clamping elements as just described and the other two fitted in position later to make the final joint. Once the joint has been completed the individual holding devices may be removed for subsequent use.

Each individual device preferably exerts a gripping action so as to hold the clamping element between the end of the tubular member and the device; for example, each individual device may be in the form of a jig which is secured to the respective tubular member and has a projecting portion which extends over the clamping element so as to exert the gripping action on the latter. As an alternative the device may merely comprise a screw passing through the clamping element and into the end of the tubular member. Although apparently simpler, this has the disadvantage that both the clamping element and the tubular member have to be drilled for the purpose and moreover that the respective holes must be brought into register with one another. With either form of device, however, there is the major advantage that the joint can be temporarily assembled without the second clamping element in position and that the subsequent fitting of the other clamping element in order to complete the joint is not in any way impeded.

The invention will now be described in more detail by way of example with reference to the accompanying drawings in which:

FIG. 1 is a perspective view of a jig used as a temporary holding device in accordance with the invention;

FIGS. 2 to 4 are views of successive stages in the assembly of a joint using a jig in accordance with FIG. 1;

FIG. 5 is a diagrammatic elevation showing stages in the assembly of a space frame.

Figure 6:
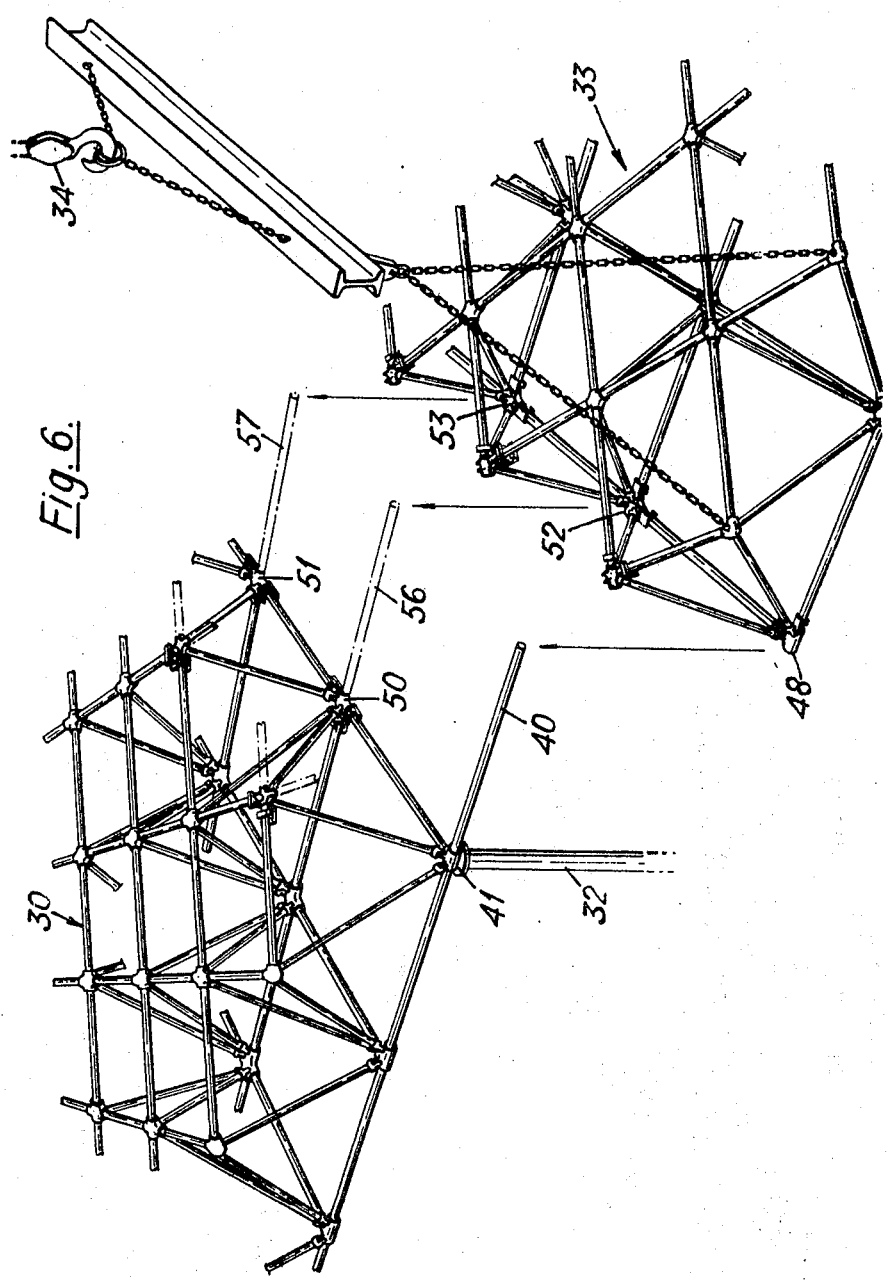
FIG. 6 is a perspective view similar to FIG. 5 but showing the construction in rather more detail.

Turning first to FIGS. 1 to 4 a jig which is used as a temporary holding device in accordance with the invention is indicated generally as 1 and comprises a saddle piece 2 formed at one end with a flange 12 which is recessed at 3 so as to engage a tubular member 4 as shown in FIG. 2. The part 1 is held against the tubular member by a pair of bolts 5 which are passed through a lower bridging member 6 which fits against the underside of the tubular member 4 as seen in FIG. 2. At the end opposite from the flange 12 the part 2 constitutes a projecting portion 7 which engages the upper surface of a clamping element indicated generally as 8 in FIG. 2. As a result of this the clamping element is gripped between the end portion 9 of the tubular member 4 and the projecting portion 7 of the jig.

The clamping element itself is constructed in accordance with the copending application referred to above and will therefore only be described briefly. It is designed to cooperate with a similar lower clamping element 10 seen in FIG. 4 and the two elements between them define four tubular sockets 11 for the reception of the ends 9 of the tubular members 4. The ends 9 are formed with alternating ridges and recesses and the sockets 11 are similarly shaped to engage the ends 9. When completely assembled as shown in FIG. 4 the clamping elements 8 and 10 are held together by a bolt 15 and serve to grip the ends 9 of the tubular members 4 so as to form a permanent joint between them. In addition the upper clamping element 8 has lugs 16 for the reception of the ends of bracing members 17, and the projecting portion 7 of the saddle member 2 of the jig 1 is therefore formed with a central slot 18 for the reception of a lug 16 as shown in FIGS. 2 and 3.

When assembling the majority of joints in a space frame it is possible to bring the ends 9 of the tubular members 4 together in such a way that both the clamping elements 8 and 10 can be fitted immediately and the joint completed without difficulty. As previously described however, this is not possible with the joints between adjacent sub-assemblies. These joints which come at the edges of the sub-assemblies in question need to be partially made before the sub-assembly is raised into position and then completed in situ. It is to facilitate this operation that the jig 1 shown in FIG. 1 is used as will now be described in more detail.

When the sub-assembly is built up either at ground level on the site, or in the erection shop, one or more of the tubular members 4 are first temporarily connected to the upper clamping element 8 by means of jigs 1. For this purpose each jig 1 is fitted onto the end of the tubular member 4 as previously described, and as shown in FIG. 2, and the bolts 5 are tightened up until the clamping element 8 is firmly gripped against the end 9 of the tubular member. This grip is sufficient to sustain the joint on a temporary basis until the sub-assembly has been fitted in position. FIG. 2 shows only one of the tubular members being held in this way but in some cases two or even three of the members meeting at a joint may thus be temporarily secured.

With the joint temporarily held in this manner the sub-assembly is then raised into position and the ends of the remaining tubular members are brought into their correct positions in relation to the remainder of the joint. This is illustrated by FIG. 3 which shows the end of a tubular member 24 which is located in its respective socket in the clamping element 8 but is not held in position. At this stage it will be seen that the underside of the joint is completely unobstructed, thus rendering it possible to bring up the lower clamping element 10 and to secure it in position by means of the bolt 15 as illustrated in FIG. 4. Once this has been done the temporary holding jig or jigs 1 are removed and the parmanent joint is then left as shown in FIG. 4.

The application of the principle just described to the erection of a space frame is illustrated in FIGS. 5 and 6.

In FIG. 5 one sub-assembly is indicated generally as 30 and is shown as supported on a pair of stanchions 31 and 32. A second similar subassembly is assembled in advance and is shown at ground level in dotted lines as 33′. This sub-assembly is then lifted by a crane indicated as 34 to a position shown in full lines as 33 in which it is to be connected to the sub-assembly 30. In order to connect these two sub-assemblies additional tubular members indicated in dotted lines as 36, 37, 38 and 39 require to be added while a member 40 shown as a full line is already permanently connected to a joint 41. The reason for this is that this joint is supported by the stanchion 32 and must therefore be completed before the sub-assembly 30 is raised in position. The member 40 therefore requires to be supported temporarily in the horizontal position, for example, by means of a chain or rope.

In order to permit the assembly just described it will be appreciated that joints shown as 45, 46, 47 and 48 can only be made partially when the sub-assemblies are assembled and must therefore be held temporarily as already described and then subsequently completed. This is illustrated in more detail in the perspective view of FIG. 6.

As can be seen, the member 40 is already permanently connected to the joint 41, but other similar joints shown as 50 and 51 are made only temporarily by means of jigs 1. Similarly the joint 48 on the sub-assembly 33 and corresponding joints 52 and 53 are also made only temporarily until the sub-assembly has been moved into position. Once the sub-assembly is in position the joint 48 can be completed by connection to the end of the member 40 and after this has been done the temporary holding devices can be removed. Further tubular members 56 and 57 can then be added, enabling the joints 50 and 51 and also 52 and 53 to be completed in a similar manner. It is then necessary to add diagonal members 38 and 39. This does not affect the main joints themselves, however, since as already described these diagonal members are connected to the lugs 16. Corresponding diagonal bracing members are fitted to the joints 50, 52 and 53 after which the main members 36 and 37 and corresponding members for the other panels may be fitted to complete the structure.

We claim:

1. A method of assembling a joint between the ends of a number of tubular steel members lying substantially in a common plane and forming part of a space frame, the joint being made by means of a pair of clamping elements between which the ends of the tubular members are gripped, said method comprising the steps of connecting the end of at least one said tubular member temporarily and independently to one of said clamping elements, by an individual device which does not impede the subsequent fitting of said second clamping element; bringing the ends of further said tubular members into register with said first clamping element; securing said second clamping element to said first clamping element whereby to grip the ends of all said tubular members; and finally removing said individual device.

2. A method according to claim 1, in which each individual device exerts a gripping action so as to hold said first clamping element between the end of said tubular member and said device.

3. A method according to claim 2, in which each individual device is in the form of a jig which is secured to said respective tubular member and has a projecting portion which extends over said first clamping element so as to exert said gripping action.

4. A method according to any one of the preceding claims in which said clamping elements are shaped so as to define sockets for the reception of the ends of said tubular members.

5. A method of assembling a space frame in which joints between tubular members lying substantially in a common plane are made by pairs of clamping elements between which the ends of the tubular members are gripped and in which sufficient joints are completed in order to construct one part of the frame which is subsequently to be connected to one or more further such parts, and each remaining joint, by means of which such subsequent connection is to be made, is assembled by connecting the end of at least one said tubular member temporarily and independently to one of said clamping elements, by an individual device which does not impede the subsequent fitting of said second clamping element; bringing the ends of further said tubular members into register with said first clamping element, securing said second clamping element to said first clamping element whereby to grip the ends of all said tubular members; and finally removing said individual device.

References Cited

UNITED STATES PATENTS

| | | |
|---|---|---|
| 1,650,233 | 11/1927 | Plunkett. |
| 1,951,220 | 3/1934 | Tarr _____ 287—111 |
| 2,658,776 | 11/1953 | Wilcox _____ 287—111 X |
| 2,001,215 | 5/1935 | Ruppel _____ 287—111 X |
| 2,680,277 | 6/1954 | Dodson et al. _____ 29—526 |
| 2,817,547 | 12/1957 | Canepa _____ 287—54 |
| 2,839,320 | 6/1958 | Hill _____ 285—419 X |

FOREIGN PATENTS 672,764    5/1952    Great Britain.

CHARLIE T. MOON, Primary Examiner

U.S. Cl. X.R.

29—526; 287—54, 111